(12) United States Patent
Okumura et al.

(10) Patent No.: US 11,028,525 B2
(45) Date of Patent: Jun. 8, 2021

(54) APPARATUS MANAGEMENT SYSTEM

(71) Applicant: Panasonic Intellectual Property Management Co., Ltd., Osaka (JP)

(72) Inventors: Meitoku Okumura, Gifu (JP); Masamichi Kachi, Aichi (JP); Tsuraki Nakajima, Aichi (JP); Ayumi Konishi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 59 days.

(21) Appl. No.: 16/490,077

(22) PCT Filed: Mar. 19, 2018

(86) PCT No.: PCT/JP2018/010682
§ 371 (c)(1),
(2) Date: Aug. 30, 2019

(87) PCT Pub. No.: WO2018/180654
PCT Pub. Date: Oct. 4, 2018

(65) Prior Publication Data
US 2020/0011005 A1  Jan. 9, 2020

(30) Foreign Application Priority Data

Mar. 31, 2017 (JP) .............................. JP2017-069652

(51) Int. Cl.
*D06F 58/30* (2020.01)
*D06F 58/10* (2006.01)
(Continued)

(52) U.S. Cl.
CPC ............. *D06F 58/30* (2020.02); *D06F 58/10* (2013.01); *F24D 15/00* (2013.01); *F26B 9/02* (2013.01);
(Continued)

(58) Field of Classification Search
CPC ...... D06F 58/30; D06F 2105/24; D06F 58/10; F26B 9/00; F26B 9/02; F24D 15/00
(Continued)

(56) References Cited

U.S. PATENT DOCUMENTS 7,774,096 B2 * 8/2010 Goerg ................ A47K 10/3845
700/236
8,202,146 B1 * 6/2012 Johnson .................... F24F 7/06
454/187
(Continued)

FOREIGN PATENT DOCUMENTS

CN 104481904 A 4/2015
CN 105159125 A 12/2015
(Continued)

OTHER PUBLICATIONS

International Search Report for corresponding Application No. PCT/JP2018/010682, dated Jun. 19, 2018.
(Continued)

*Primary Examiner* — Stephen M Gravini
(74) *Attorney, Agent, or Firm* — Renner, Otto, Boisselle & Sklar, LLP

(57) ABSTRACT

An apparatus management system is provided which includes a bathroom heating and drying apparatus configured to control an air environment in a bathroom space; and a control terminal connected to the bathroom heating and drying apparatus to transmit and receive information to and from the bathroom heating and drying apparatus. The control terminal includes: condition acquisition unit configured to acquire operation information related to a control condition of the bathroom heating and drying apparatus; control condition determination unit configured to determine the control condition of the bathroom heating and drying apparatus, based on the operation information acquired by the condition acquisition unit; and an operating unit configured
(Continued)

to operate the bathroom heating and drying apparatus under the control condition determined by the control condition determination unit.

10 Claims, 4 Drawing Sheets

(51) Int. Cl.
    *F24D 15/00*     (2006.01)
    *F26B 9/02*     (2006.01)
    *D06F 103/36*     (2020.01)
    *D06F 105/24*     (2020.01)

(52) U.S. Cl.
    CPC ...... *D06F 2103/36* (2020.02); *D06F 2105/24* (2020.02)

(58) Field of Classification Search
    USPC .......................................................... 34/493
    See application file for complete search history.

(56) References Cited

U.S. PATENT DOCUMENTS 10,313,458 B2 * 6/2019 Gagnon ................. H04L 67/22
2012/0260418 A1 * 10/2012 Rundberg ............... E03C 1/057
    4/623
2016/0028838 A1 * 1/2016 Gagnon .............. H04L 41/0803
    709/224
2019/0379751 A1 * 12/2019 Gagnon ................. A47K 10/48
2020/0011005 A1 * 1/2020 Okumura ............... D06F 58/30
2020/0385972 A1 * 12/2020 Labuda ..................... E03D 9/04

FOREIGN PATENT DOCUMENTS

| | | | | |
|---|---|---|---|---|
| CN | 106373312 A | 2/2017 | | |
| JP | 2012-251731 A | 12/2012 | | |
| JP | 2015-225358 A | 12/2015 | | |
| JP | 2016-61525 A | 4/2016 | | |
| JP | 2016-129596 A | 7/2016 | | |
| JP | WO2018180654 A1 * | 2/2020 | ............ | F26B 21/001 |
| WO | WO-2016010535 A1 * | 1/2016 | ............... | F24F 11/72 |
| WO | WO-2016014818 A1 * | 1/2016 | ............ | H04L 67/22 |
| WO | WO-2018180654 A1 * | 10/2018 | ............... | F26B 9/02 |

OTHER PUBLICATIONS

English Translation of Chinese Search Report dated Nov. 23, 2020 for the related Chinese Patent Application No. 201880019656.4.

* cited by examiner

APPARATUS MANAGEMENT SYSTEM

TECHNICAL FIELD

The present disclosure relates to an apparatus management system.

BACKGROUND ART

There have been known management systems that make the environment in an indoor space more comfortable by introducing outside air.

For example, there have been developed techniques in which a management system measures room temperature inside a building and ambient temperature, and when a resident of the building comes to feel comfortable due to the introduction of outside air, the system sends a message that advises the resident to open a major window for ventilation in the building, and the system controls the on/off state of an air conditioner configured to control temperatures inside the building in accordance with an open or closed state of the window (Patent Literature 1).

CITATION LIST

Patent Literature 1: Japanese Patent Unexamined Publication No. 2012-251731

SUMMARY OF INVENTION

However, there has been desired a system capable of not only executing control on the assumption that a person is present in a room, but also, for example, adjusting the air environment in the room before a person enters the room.

An object of the present disclosure is to solve such a problem, that is, to provide an apparatus management system configured to control the air environment in an indoor space by detecting a time at which a person on the road returns to a site, such as a residence.

In order to achieve the above-described object, one aspect of an apparatus management system according to the present disclosure includes: a bathroom heating and drying apparatus configured to control the air environment in a bathroom space; and a control terminal connected to the bathroom heating and drying apparatus to transmit and receive information to and from the bathroom heating and drying apparatus. The control terminal includes: a condition acquisition unit configured to acquire operation information related to a control condition of the bathroom heating and drying apparatus; a control condition determination unit configured to determine the control condition of the bathroom heating and drying apparatus, based on the information acquired by the condition acquisition unit; and an operating unit configured to operate the bathroom heating and drying apparatus under the control condition determined by the control condition determination unit.

The apparatus management system according to the present disclosure is capable of detecting a time at which a person (user) on the road returns to a site, such as a residence, and efficiently changing the control condition in accordance with the time of user's arrival. Therefore, the apparatus management system is useful as an apparatus management system for preparing a suitable air environment in the indoor space while reducing energy loss even when no person is present at the site.

DESCRIPTION OF EMBODIMENTS

Figure 1:
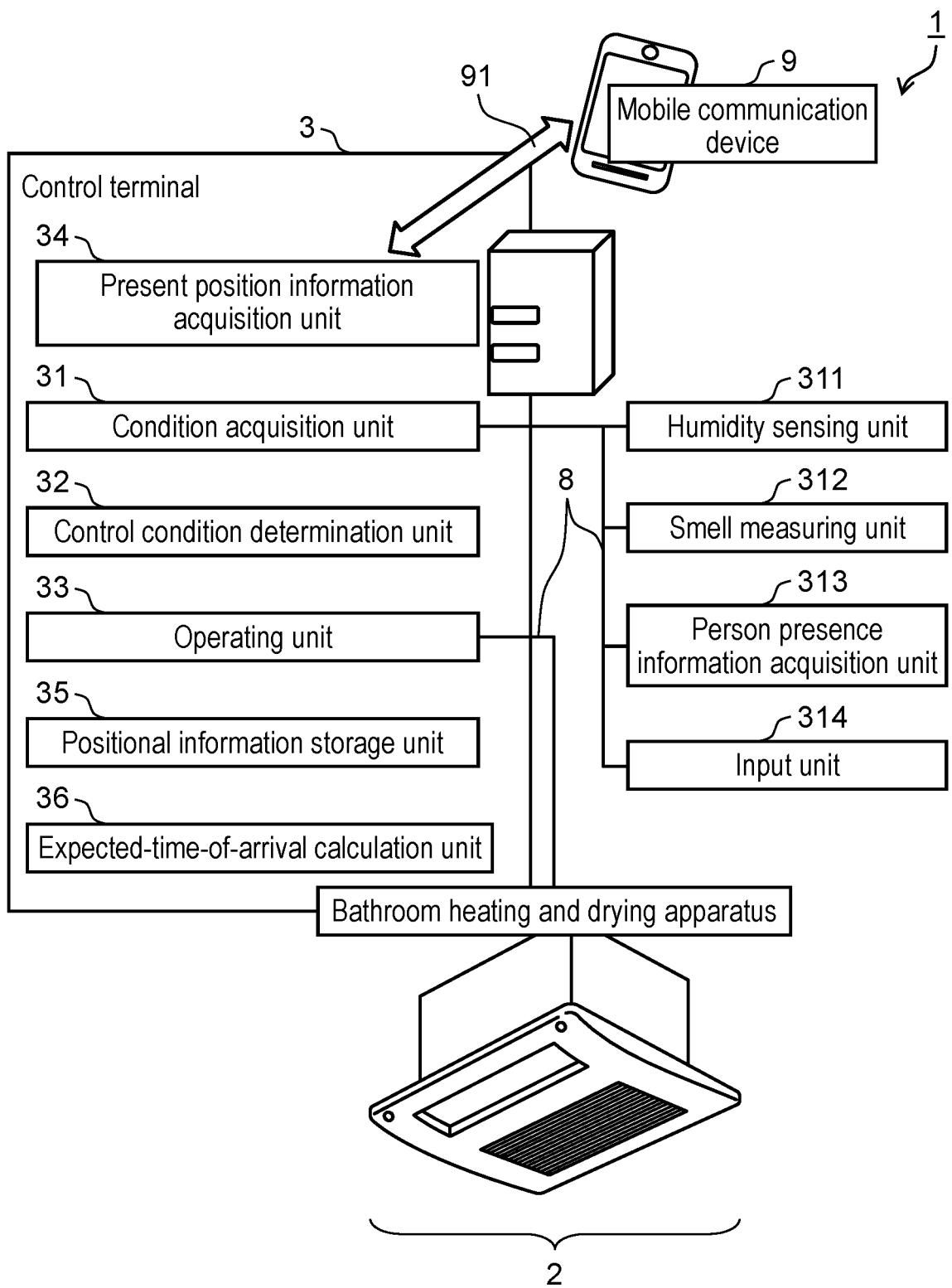
FIG. 1 is a block diagram of an apparatus management system according to an embodiment.

Hereinafter, embodiments of the present disclosure will be described with reference to the drawings. Note that each of the following embodiments is a preferred specific example of the present disclosure. Hence, numeric values, shapes, materials, constituents, the arrangement and connection of the constituents, steps (processes), and the order of the steps, each being shown in the following embodiments, are merely examples, and do not limit the scope of the present disclosure. Therefore, among the constituents in the following embodiments, constituents not recited in any one of independent claims which define the broadest scope of the present disclosure are described as optional constituents.

Note that, in the drawings, substantially identical constituents are given the same reference number, and a duplicate description thereof will be omitted or simplified.

(Embodiments)

First, the configuration of apparatus management system 1 according to an embodiment of the present disclosure is described using FIGS. 1 to 4.

Figure 2:
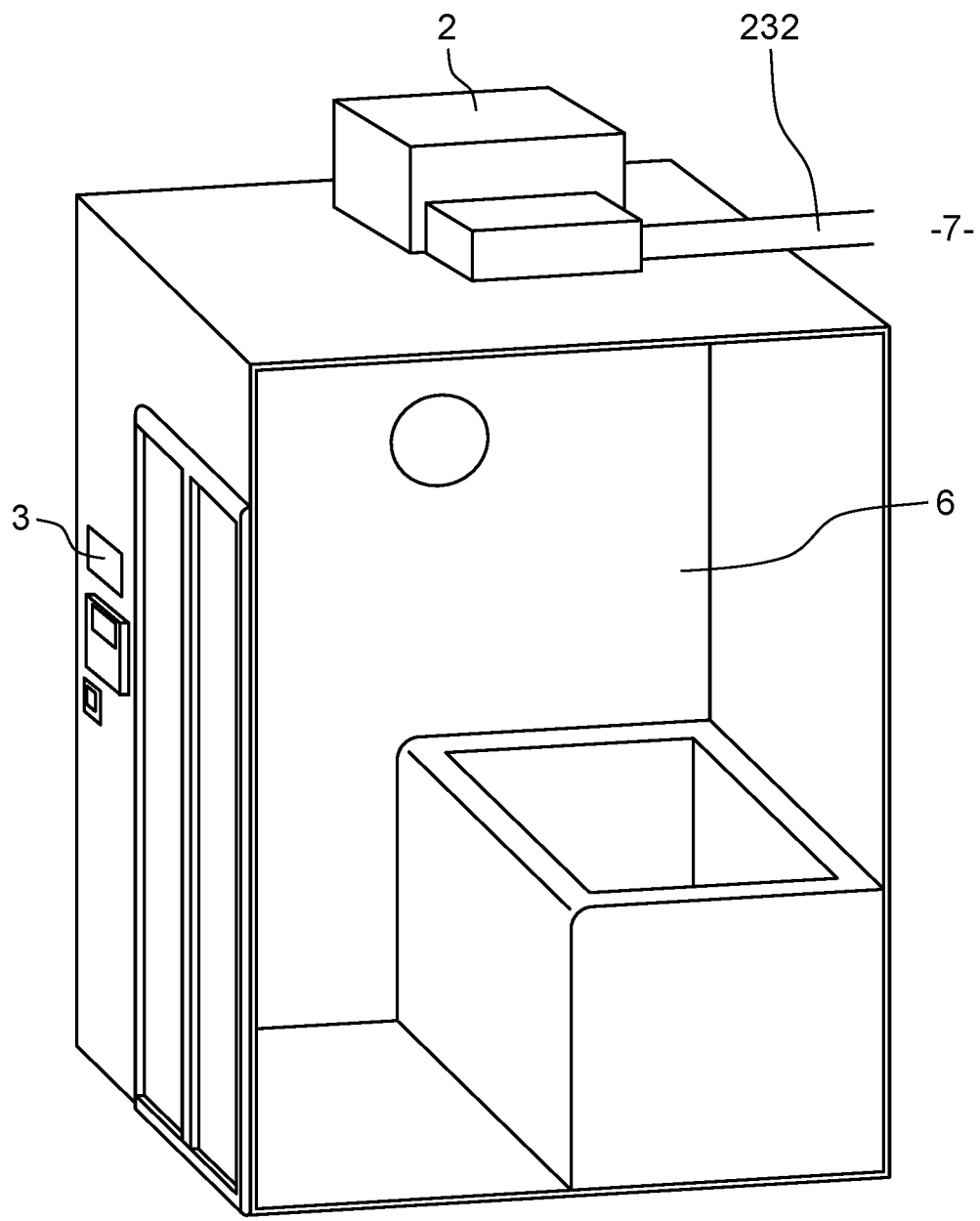
FIG. 2 is a schematic diagram of an example of an indoor space in the embodiment.
Figure 3:
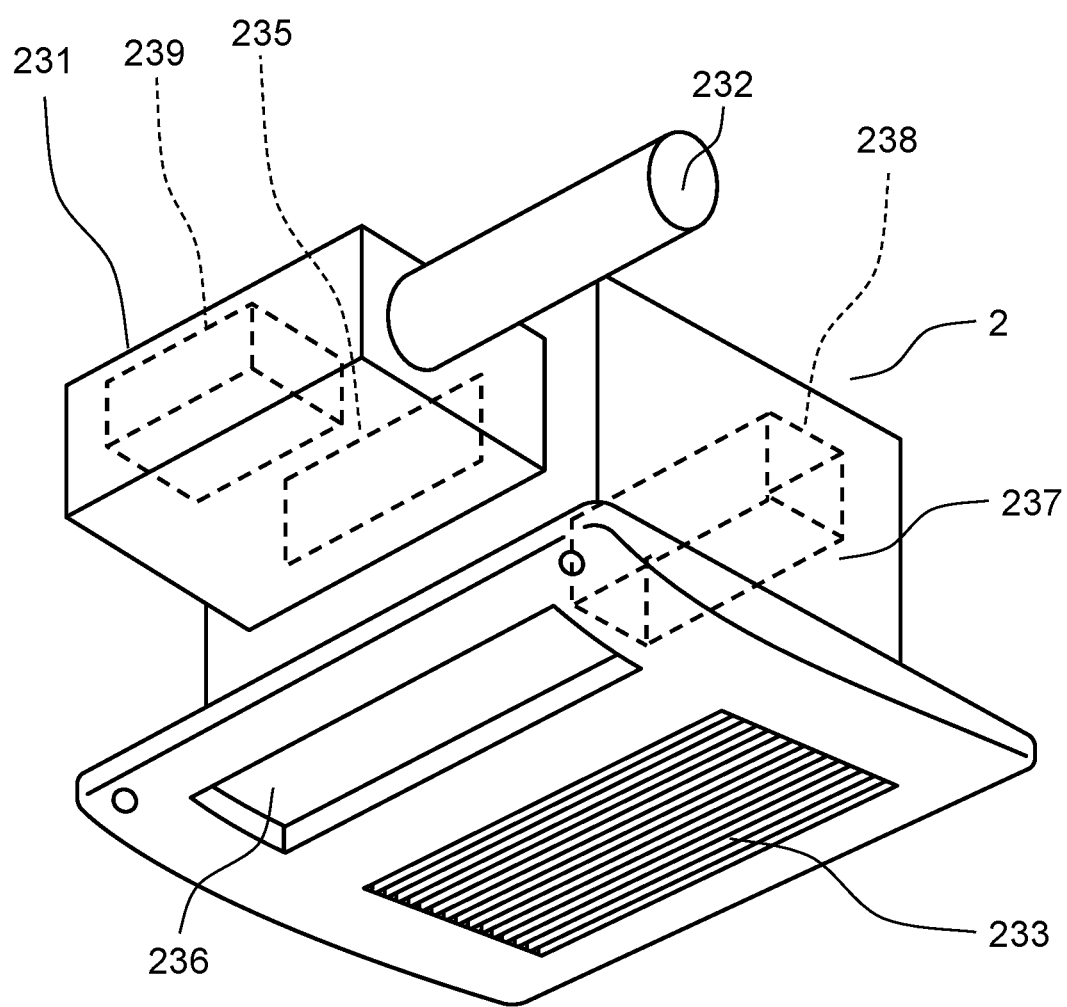
FIG. 3 is a schematic diagram of an example of a bathroom heating and drying apparatus in the embodiment.
Figure 4:
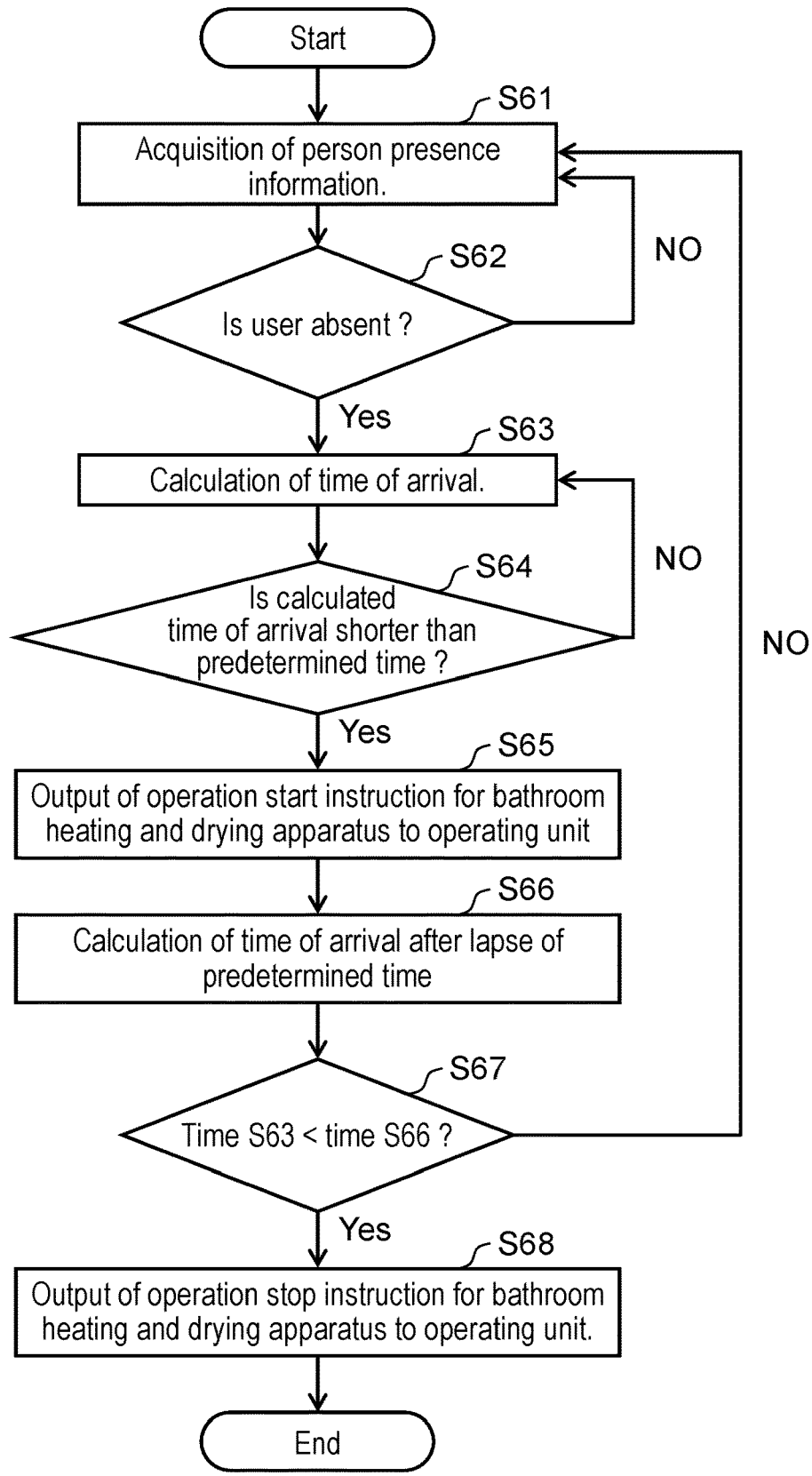
FIG. 4 is a flowchart illustrating an example of operation of a control condition determination unit.

FIG. 1 is a block diagram of the apparatus management system according to the embodiment. FIG. 2 is a schematic diagram of an example of an indoor space in the embodiment. FIG. 3 is a schematic diagram of an example of a bathroom heating and drying apparatus in the embodiment. FIG. 4 is a flowchart illustrating an example of operation of a control condition determination unit.

[Basic Configuration of Apparatus Management System]

As illustrated in FIG. 1, apparatus management system 1 according to the present embodiment includes bathroom heating and drying apparatus 2 and control terminal 3.

As illustrated in FIG. 2, bathroom heating and drying apparatus 2 is configured to control the air environment in bathroom space 6. Furthermore, bathroom heating and drying apparatus 2 is exemplified as a bathroom heating and drying apparatus configured to control the air environment in bathroom space 6 and convey air to outdoor space 7. Here, bathroom space 6 refers to a space enclosed by walls, a floor, and a roof, and can be rephrased as the interior of a building. A space provided with a window and a duct for ventilation in a state capable of ventilation also corresponds to bathroom space 6. In contrast to the interior of the building, outdoor space 7 refers to a space lacking at least one of a wall and a roof, and can be rephrased as the exterior of the building.

Control terminal 3 is connected to bathroom heating and drying apparatus 2 to transmit and receive information to and from bathroom heating and drying apparatus 2. Note that, in the present embodiment, as illustrated in FIG. 1, control terminal 3 is connected to bathroom heating and drying apparatus 2 via internal network 8. Here, internal network 8 refers to a network arranged in an indoor space and configured to connect communication terminals under the management of the network. In contrast, a network connected to a communication terminal arranged in outdoor space 7 is referred to as external network 91, and specific examples of external network 91 include the Internet and a public line including the Internet.

Hereinafter, constituents of apparatus management system 1 will be described.

[Bathroom Heating and Drying Apparatus]

As illustrated in FIG. 3, bathroom heating and drying apparatus 2 includes: a heating unit (not illustrated) configured to heat air; bathroom heating and drying apparatus main body 237; and ventilation unit 231.

The heating unit is a heater, specifically, a positive temperature coefficient (PTC) heater.

Bathroom heating and drying apparatus main body 237 has circulation fan 238 thereinside. In the bottom face of bathroom heating and drying apparatus main body 237, indoor air inlet 233 configured to draw air from bathroom space 6 and indoor air outlet 236 configured to discharge air to bathroom space 6 are provided.

Ventilation unit 231 is provided on the side face of bathroom heating and drying apparatus main body 237, and includes exhaust fan 239 configured to exhaust air from bathroom space 6 to outdoor space 7; and outdoor air outlet 232.

Circulation fan 238 and exhaust fan 239 each include, for example, an impeller held by a rotating shaft of a motor. By energizing the motor to rotate the impeller on the rotating shaft, circulation fan 238 causes air to flow from the indoor air inlet 233 to indoor air outlet 236. Here, air drawn in from indoor air inlet 233 is heated by a PTC heater serving as the heating unit. The heated air is discharged by circulation fan 238 to bathroom space 6 via indoor air outlet 236 to heat bathroom space 6. Exhaust fan 239 causes air to flow from indoor air inlet 233 to outdoor air outlet 232. In other words, circulation fan 238 produces an air current that flows from bathroom space 6 via the inside of bathroom heating and drying apparatus 2 to bathroom space 6, that is, a circulating air current that circulates through bathroom space 6. Exhaust fan 239 produces an air current that flows from indoor air inlet 233 to outdoor air outlet 232, that is, an exhaust air current that flows from bathroom space 6 to outdoor space 7.

Bathroom heating and drying apparatus 2 is preferably a bathroom heater-dryer configured to dry the laundry hung in bathroom space 6. Bathroom heating and drying apparatus 2 is provided in the ceiling of a bathroom such that indoor air inlet 233 and indoor air outlet 236 are arranged in the ceiling of the bathroom, and outdoor air outlet 232 is arranged in the back of the ceiling.

Bathroom heating and drying apparatus 2 is preferably capable of controlling the temperature in bathroom space 6 by imparting a multi-stage heating function for bathroom space 6 to the heating unit. This configuration allows the operation of bathroom heating and drying apparatus 2 to be controlled so as to achieve heating performance appropriate for drying and heating in bathroom space 6.

Bathroom heating and drying apparatus 2 may include exhaust shutter 235 capable of opening and closing a conveying path for conveying air from bathroom space 6 to outdoor space 7. When bathroom heating and drying apparatus 2 raises the temperature in bathroom space 6, exhaust shutter 235 is closed, whereby bathroom space 6 can be efficiently heated.

[Humidity Sensing Unit]

Apparatus management system 1 may further include humidity sensing unit 311 configured to sense humidity information, that is, the indoor humidity in bathroom space 6. Examples of humidity sensing unit 311 include a humidity sensor.

Humidity sensing unit 311 is configured to electrically acquire humidity information, and transmits the acquired humidity information to condition acquisition unit 31 (described in detail later) of control terminal 3 via internal network 8.

Apparatus management system 1, by including humidity sensing unit 311, can compare an indoor humidity and a target indoor humidity which is a predetermined target threshold of humidity in bathroom space 6 to control bathroom heating and drying apparatus 2 more efficiently.

Here, as a substitute for humidity sensing unit 311, another constituent included in bathroom heating and drying apparatus 2 can be used. In this case, acquired humidity information is sent to operating unit 33 (described in detail later) of control terminal 3 via internal network 8.

[Smell Measuring Unit]

Apparatus management system 1 may further include smell measuring unit 312 configured to measure a smell in bathroom space 6. Examples of smell measuring unit 312 include a smell sensor. Note that the smell sensor converts a smell into smell information and acquires the smell information.

Smell measuring unit 312 is configured to electrically acquire smell information and transmit the acquired smell information to condition acquisition unit 31 of control terminal 3 via internal network 8.

Apparatus management system 1, by including smell measuring unit 312, can compare a smell value in bathroom space 6 and a target indoor environment in bathroom space 6, that is, a reference smell value (a predetermined smell threshold) to control bathroom heating and drying apparatus 2 more efficiently. The smell value mentioned herein refers to, for example, the intensity of a smell.

Here, as is the case with humidity sensing unit 311, another constituent included in bathroom heating and drying apparatus 2 can be used as a substitute for smell measuring unit 312.

[Person Presence Information Acquisition Unit]

Apparatus management system 1 may further include person presence information acquisition unit 313 configured to acquire person presence information about whether or not any person is present in a building. Examples of person presence information acquisition unit 313 include a human sensor.

Person presence information acquisition unit 313 is configured to electrically acquire person presence information and transmit the acquired person presence information to condition acquisition unit 31 of control terminal 3 via internal network 8.

Apparatus management system 1, by including person presence information acquisition unit 313, can use humidity sensing unit 311 and smell measuring unit 312 more effectively. Furthermore, apparatus management system 1 can be made use of as a security system when control terminal 3 acquires person presence information via internal network 8 and transmits the person presence information to mobile communication device 9 via external network 91. Examples of mobile communication device 9 mentioned herein include a tablet terminal and a mobile phone terminal.

Note that, when arranged in a plurality of rooms of a building, person presence information acquisition unit 313 can sense person presence information with higher accuracy. Person presence information acquisition unit 313 is not limited to a specific module, and indirect information, such as electric usage, which is obtainable from a network can be used as a substitute for person presence information acquisition unit 313.

[Input Unit]

Apparatus management system 1 may further include input unit 314 configured to accept an input of the time of arrival of a person at a building.

Input unit 314 is configured to acquire information on the time of person's arrival by using a remote controller for bathroom heating and drying apparatus 2. The acquired information on the time of arrival is transmitted to condition acquisition unit 31 of control terminal 3 via internal network 8. Alternatively, it may be configured such that the information is inputted by another apparatus in the building via internal network 8 or by mobile communication device 9 used as an input unit to transmit the information to control terminal 3. Alternatively, it may be configured such that information on the present position of mobile communication device 9 is transmitted to present position information acquisition unit 34 (described in detail later) of control terminal 3 via external network 91. Input unit 314 is not limited to an input terminal, and calculation using indirect information, such as information on a present position, which is obtainable from a network as described above can be made use of as a substitute for input unit 314.

[Control Terminal]

As shown in FIG. 1, control terminal 3 includes condition acquisition unit 31, control condition determination unit 32, and operating unit 33.

Condition acquisition unit 31 is configured to acquire operation information related to a control condition of bathroom heating and drying apparatus 2. Examples of the operation information related to the control condition include the time of arrival of a person at a building, indoor humidity in bathroom space 6, the intensity of a smell in bathroom space 6, and person presence information about whether or not any person is present. Condition acquisition unit 31 acquires at least one of these items of operation information related to the control condition.

Note that the time required for a user on the road to arrive at a building is defined as the time of arrival.

Examples of a method by which condition acquisition unit 31 acquires the indoor humidity in bathroom space 6, the intensity of a smell in bathroom space 6, person presence information in a building, and the time of user's arrival include a method of acquiring information from humidity sensing unit 311, smell measuring unit 312, person presence information acquisition unit 313, or input unit 314, each unit being connected via internal network 8.

As a method by which condition acquisition unit 31 acquires the time of arrival, input unit 314 is mentioned, but, examples of the method further include a method of inputting the time of arrival via an input device provided in control terminal 3. Alternatively, for example, condition acquisition unit 31 may be connected to a display panel via internal network 8 and the time of arrival may be inputted using the display panel. Alternatively, the time of arrival may be inputted using mobile communication device 9, such as a tablet terminal or a mobile phone terminal. The inputted time of arrival is transmitted to condition acquisition unit 31 via external network 91, that is, by wireless communications. Mobile communication device 9 has a positional information acquisition function with which to acquire base station information used by GPS or wireless communications, and thereby acquire positional information on mobile communication device 9 at a time point, that is, information on the present position of mobile communication device 9. Control terminal 3 is connected to external network 91, thereby being capable of communicating, via external network 91, with mobile communication device 9 connected to external network 91.

Control terminal 3 may include present position information acquisition unit 34, positional information storage unit 35, and expected-time-of-arrival calculation unit 36. Present position information acquisition unit 34 is configured to acquire information on the present position of mobile communication device 9 more than once at different time points from mobile communication device 9. Positional information storage unit 35 is configured to store positional information on control terminal 3. Expected-time-of-arrival calculation unit 36 calculates the distance between control terminal 3 and mobile communication device 9, based on the positional information on control terminal 3, and the information on the present position of mobile communication device 9. Then, expected-time-of-arrival calculation unit 36 calculates the movement speed of mobile communication device 9 by using the plurality of items of present position information acquired by present position information acquisition unit 34, and thereby calculates the expected time of arrival of mobile communication device 9 at the position of control terminal 3.

Control condition determination unit 32 determines a control condition of bathroom heating and drying apparatus 2, based on the operation information acquired by condition acquisition unit 31. A method of determining the control condition is, for example, to estimate the time of user's arrival by processing described later, and, with respect to the estimated time of arrival, adjust the time to complete the heating and drying of bathroom heating and drying apparatus 2 and change a driving time for a heater. Thus, in accordance with a user's schedule, control condition determination unit 32 reduces energy loss and improves usability.

Based on the operation information acquired by condition acquisition unit 31, control condition determination unit 32 operates exhaust fan 239 of ventilation unit 231 of bathroom heating and drying apparatus 2 before the time of arrival, and thereby discharges air in bathroom space 6 to outdoor space 7 to perform ventilation, whereby a smell due to the humidity in bathroom space 6 is removed to improve usability.

Operating unit 33 operates bathroom heating and drying apparatus 2 under the control condition determined by control condition determination unit 32.

Example of Control Condition Determination by Control Terminal

An example of a workflow in which control condition determination unit 32 determines a control condition by using operation information acquired by condition acquisition unit 31 will be described using FIG. 4.

Control condition determination unit 32 acquires person presence information of person presence information acquisition unit 313 from condition acquisition unit 31 (Step S61).

Next, control condition determination unit 32 determines user's presence, that is, whether or not a user is absent, based on the person presence information (Step S62). If control condition determination unit 32 determines, based on person presence information, that a user is absent (Yes at step S62), expected-time-of-arrival calculation unit 36 or input unit 314 estimates the time of user's arrival (Step S63). Note that, if control condition determination unit 32 determines, based on the person presence information, that a user is not absent (No at Step S62), the process returns to step S61.

Next, control condition determination unit 32 determines whether or not the estimated time of user's arrival is shorter than a predetermined time (a predetermined time threshold) (Step 64). The predetermined time mentioned herein refers to a time required to complete the drying of clothes and the preparation of a suitable air environment in bathroom space 6 before user's arrival, and is set in advance. Here, the predetermined time depends on, for example, the air environment, desired by a user, in bathroom space 6 or the power of bathroom heating and drying apparatus 2. The time of arrival depends on a user's transportation means. Therefore, it is configured such that a user can appropriately change the predetermined time via a display panel or the like. If the estimated time of user's arrival is shorter than the predetermined time (Yes at step S64), control condition determination unit 32 outputs an operation start instruction for bathroom heating and drying apparatus 2 to operating unit 33 (Step S65). If the estimated time of user's arrival is longer than the predetermined time (No at step S64), the process returns to Step S63. Thus, by setting the predetermined time longer as needed and providing a longer time to prepare a suitable air environment in bathroom space 6, air environment required by a user can be provided before user's arrival.

With this configuration, even in the case where a user is out, bathroom heating and drying apparatus 2 can start operation at the time when a person (the user) is about to arrive at a building, without the need for setting a time of arrival in advance by using a timer or the like. Here, examples of the operation start of bathroom heating and drying apparatus 2 include the start-up of operation from a shutdown state and an increase in heating power, such as turning ON or increasing of the heater output of bathroom heating and drying apparatus 2 during heating operation or clothes drying operation. Examples of the operation start further include operations such as turning ON of ventilation unit 231 or increasing the output of ventilation unit 231 to remove a smell in bathroom space 6 after the completion of a drying operation, but, the operation start is not limited to them.

Next, after the completion of step S65, control condition determination unit 32 estimates the time of user's arrival again after a lapse of a predetermined time, with expected-time-of-arrival calculation unit 36 or input unit 314 (Step 66). Then, control condition determination unit 32 compares the time of user's arrival estimated at Step 66 and the time of user's arrival estimated at Step S63 (Step S67). If the time of user's arrival estimated at Step S66 is longer than the time of user's arrival estimated at Step S63 (Yes at Step S67), control condition determination unit 32 determines that the user's arrival will be delayed. Then, control condition determination unit 32 outputs, to operating unit 33, an instruction to stop the operation of bathroom heating and drying apparatus 2 under operation (Step S68). Here, examples of the operation stop of bathroom heating and drying apparatus 2 include operations, such as a decrease in heating power, such as turning OFF of the heater or lowering of the output of the heater, or operations, such as turning OFF or lowering of ventilation unit 231 under ventilating operation, but the operation stop is not limited to them. If the time of user's arrival estimated at Step S66 is shorter than the time of user's arrival estimated at Step 63 (No at Step S67), control condition determination unit 32 determines that the time of user's arrival will be advanced, and the process returns to Step S61.

With this configuration, in the case where, during a clothes drying operation, a possibility that a user immediately arrives at bathroom space 6 becomes low, the heater output of bathroom heating and drying apparatus 2 in the clothes drying operation is controlled so that power consumed until the completion of clothes drying can be reduced. In addition, in the case where a user returns earlier, heating and clothes drying are completed in accordance with the time of user's arrival so that usability can be improved. Furthermore, by performing a ventilation operation in accordance with a time of user's arrival, a smell caused by mold and the like can be removed, especially, a smell caused by half-dried clothes after the completion of a clothes drying operation is removed, so that usability can be improved. Note that, when the time of user's arrival is estimated, if it is determined again that the user will return earlier, operation can be executed in accordance with the flow from Step S64 forward.

Furthermore, by setting the predetermined time shorter, unnecessary output of an operation start instruction can be prevented from being produced.

As described above, the apparatus management system according to the present disclosure is capable of efficiently changing a control condition in accordance with the time of user's arrival. Accordingly, even when no person is present, a suitable indoor environment can be prepared by exercising operation control with lower energy loss, although, for example, a time is needed.

Alternatively, apparatus management system 1 according to the present embodiment may perform the following control.

When it is determined that no user is present, control condition determination unit 32 compares an indoor humidity sensed by humidity sensing unit 311 with a target indoor humidity in bathroom space 6. Furthermore, control condition determination unit 32 may compare a time of arrival with a predetermined time to determine the operation of bathroom heating and drying apparatus 2.

Furthermore, in the case where the time of arrival is shorter than a predetermined time threshold and an indoor humidity is higher than a predetermined humidity threshold as a target indoor humidity, control condition determination unit 32 may raise the temperature of air blown from bathroom heating and drying apparatus 2 into the bathroom space. Alternatively, in the case where the time of arrival is shorter than the predetermined time threshold and an indoor humidity is higher than the predetermined humidity threshold, control condition determination unit 32 may increase the volume of air blown from bathroom heating and drying apparatus 2 into the bathroom space. Thus, in the case where it is determined that a user will arrive earlier, the output of bathroom heating and drying apparatus 2 is increased, whereby a desired bathroom space can be achieved in a shorter time.

Furthermore, in the case where the time of arrival is longer than the predetermined time threshold and an indoor humidity is lower than the predetermined humidity threshold, control condition determination unit 32 performs natural ventilation by putting exhaust shutter 235 into the open state and stopping exhaust fan 239 and circulation fan 238. Thus, ventilation can be performed without trapping a smell in a bathroom and consuming energy.

In the case where an indoor humidity is lower than the predetermined humidity threshold and a smell value based on smell information sensed by smell measuring unit 312 is larger than a predetermined smell threshold, as a state is expected in which clothes have been sufficiently dried and a smell has been trapped. Accordingly, control condition determination unit 32 may increase the volume of air exhausted, in the bathroom space, from bathroom heating and drying apparatus 2 to the outside of the bathroom space.

Note that the above-mentioned control conditions can be used in combination without a contradiction therebetween.

(Others)

Hereinbefore, the apparatus management system according to the present disclosure is described with the embodiments and modifications thereof, but, the present disclosure is not limited to the above-mentioned embodiments and modifications.

Besides, the scope of the present disclosure includes embodiments achieved from various types of modifications that could be devised by those skilled in the art from the above-described embodiment and modifications; and embodiments achieved from any combinations of the constituents and the functions in the above-described embodiments within a scope that does not deviate from the gist of the disclosure.

For example, although the operation of increasing the heating power of bathroom heating and drying apparatus 2 is described above as an operation example of bathroom heating and drying apparatus 2, the time of user's arrival may be estimated, and, before this time of arrival, a suitable air environment may be prepared by combining bathroom heating and drying apparatus 2 and other indoor environment control apparatuses.

INDUSTRIAL APPLICABILITY

The present disclosure makes it possible to detect a time when a person (user) on the road arrives at a base such as a residence, and efficiently changes a control condition in accordance with the time of user's arrival, and thus is useful as an apparatus management system that prepares a suitable air environment in an indoor space while reducing energy loss, even when no person is present.

REFERENCE MARKS IN ME DRAWINGS

1 . . . apparatus management system
2 . . . bathroom heating and drying apparatus
3 . . . control terminal
6 . . . bathroom space
7 . . . outdoor space
9 . . . mobile communication device
91 . . . external network
31 . . . condition acquisition unit
32 . . . control condition determination unit
33 . . . operating unit
34 . . . present position information acquisition unit
35 . . . positional information storage unit
36 . . . expected-time-of-arrival calculation unit
231 . . . ventilation unit
232 . . . outdoor air outlet
233 . . . indoor air inlet
235 . . . exhaust shutter
236 . . . indoor air outlet
237 . . . bathroom heating and drying apparatus main body
238 . . . circulation fan
239 . . . exhaust fan
311 . . . humidity sensing unit
312 . . . smell measuring unit
313 . . . person presence information acquisition unit
314 . . . input unit

The invention claimed is:

1. An apparatus management system, comprising:
a bathroom heating and drying apparatus configured to control an air environment in a bathroom space;
an input unit configured to receive an input of a time of arrival, the time of arrival being a time required for a person to arrive at a building including the bathroom space; and
a control terminal connected to the bathroom heating and drying apparatus to transmit and receive information to and from the bathroom heating and drying apparatus, the control terminal including:
a condition acquisition unit connected to the input unit and configured to acquire operation information, including the time of arrival, related to a control condition of the bathroom heating and drying apparatus;
a control condition determination unit configured to determine the control condition of the bathroom heating and drying apparatus, based on the operation information including the time of arrival acquired by the condition acquisition unit; and
an operating unit configured to operate the bathroom heating and drying apparatus under the control condition determined by the control condition determination unit.

2. The apparatus management system according to claim 1, further comprising:
a humidity sensing unit configured to sense humidity information on the bathroom space; and
a person presence information acquisition unit configured to acquire person presence information indicating whether or not a person is present in the building including the bathroom space,
wherein the condition acquisition unit is configured
to acquire the person presence information via the person presence information acquisition unit, and,
to, when the person presence information acquired by the person presence information acquisition unit indicates that no one is in the building, acquire the time of arrival inputted into the input unit and the humidity information sensed by the humidity sensing unit,
wherein the control condition determination unit is configured
to determine the control condition of the bathroom heating and drying apparatus, based on the time of arrival and the humidity information that have been acquired by the condition acquisition unit.

3. The apparatus management system according to claim 2,
wherein the control condition determination unit is configured
to compare the time of arrival with a predetermined time threshold,
to compare an indoor humidity indicated by the humidity information with a predetermined humidity threshold, and,
to, when the time of arrival is shorter than the predetermined time threshold and the indoor humidity is higher than the predetermined humidity threshold, determine the control condition to raise a temperature of air blown from the bathroom heating and drying apparatus into the bathroom space.

4. The apparatus management system according to claim 2,
wherein the control condition determination unit is configured
to compare the time of arrival with a predetermined time threshold, to compare an indoor humidity indicated by the humidity information with a predetermined humidity threshold, and, to, when the time of arrival is shorter than the predetermined time threshold and the indoor humidity is higher than the predetermined humidity threshold, determine the control condition to increase a volume of air blown from the bathroom heating and drying apparatus into the bathroom space.

5. The apparatus management system according to claim 3, wherein the bathroom heating and drying apparatus includes:

an exhaust fan configured to produce an exhaust air current that flows from the bathroom space to an outdoor space;

a circulation fan configured to produce a circulating air current that circulates through the bathroom space; and an exhaust shutter configured to open and close a conveying path for conveying air from the bathroom space to the outdoor space, and wherein the control condition determination unit is configured to, when the time of arrival is longer than the predetermined time threshold and the indoor humidity is lower than the predetermined humidity threshold, put the exhaust shutter into an open state and stop the exhaust fan and the circulation fan.

6. The apparatus management system according to claim 3, further comprising a smell measuring unit configured to measure a smell in the bathroom space, wherein the condition acquisition unit is configured to acquire information on the smell measured by the smell measuring unit, and wherein the control condition determination unit is configured to, when the indoor humidity is lower than the predetermined humidity threshold and a smell value indicated by the information on the smell is equal to or larger than a predetermined smell threshold, determine the control condition to increase a volume of exhaust air in the bathroom space from the bathroom heating and drying apparatus to an outside of the bathroom space.

7. The apparatus management system according to claim 1, wherein the control terminal further includes:

a present position information acquisition unit configured to acquire information on a present position of a mobile communication device more than once at different time points from the mobile communication device;

a positional information storage unit configured to store positional information on the control terminal; and an expected-time-of-arrival calculation unit configured to calculate a distance between the control terminal and the mobile communication device, based on the present position information acquired by the present position information acquisition unit and the positional information stored on the control terminal, to calculate a movement speed of the mobile communication device, based on a plurality of items of the information of the present position, and to calculate an expected time of arrival of the mobile communication device at a position of the control terminal, based on the distance and the movement speed, wherein the input unit is configured to regard the expected time of arrival calculated by the expected-time-of-arrival calculation unit as a time of arrival of a person at the building.

8. The apparatus management system according to claim 2, wherein the person presence information acquisition unit is configured to acquire the person presence information as a security system for detecting an intruder into the building.

9. The apparatus management system according to claim 4, wherein the bathroom heating and drying apparatus includes:

an exhaust fan configured to produce an exhaust air current that flows from the bathroom space to an outdoor space;

a circulation fan configured to produce a circulating air current that circulates through the bathroom space; and an exhaust shutter configured to open and close a conveying path for conveying air from the bathroom space to the outdoor space, and wherein the control condition determination unit is configured to, when the time of arrival is longer than the predetermined time threshold and the indoor humidity is lower than the predetermined humidity threshold, put the exhaust shutter into an open state and stop the exhaust fan and the circulation fan.

10. The apparatus management system according to claim 4, further comprising a smell measuring unit configured to measure a smell in the bathroom space, wherein the condition acquisition unit is configured to acquire information on the smell measured by the smell measuring unit, and wherein the control condition determination unit is configured to, when the indoor humidity is lower than the predetermined humidity threshold and a smell value indicated by the information on the smell is equal to or larger than a predetermined smell threshold, determine the control condition to increase a volume of exhaust air in the bathroom space from the bathroom heating and drying apparatus to an outside of the bathroom space.

* * * * *